United States Patent [19]

Trah

[11] Patent Number: 5,286,341
[45] Date of Patent: Feb. 15, 1994

[54] PROCESS FOR PRODUCING MICRO-MECHANICAL STRUCTURES

[75] Inventor: Hans-Peter Trah, Reutlingen, Fed. Rep. of Germany

[73] Assignee: Robert Bosch GmbH, Stuttgart, Fed. Rep. of Germany

[21] Appl. No.: 937,878
[22] PCT Filed: Mar. 23, 1991
[86] PCT No.: PCT/DE91/00264
§ 371 Date: Oct. 14, 1992
§ 102(e) Date: Oct. 14, 1992
[87] PCT Pub. No.: WO91/16608
PCT Pub. Date: Oct. 31, 1991

[30] Foreign Application Priority Data

Apr. 14, 1990 [DE] Fed. Rep. of Germany ....... 4012071

[51] Int. Cl.$^5$ ................. H01L 21/306; B44C 1/22; C03C 15/00; C03C 25/06
[52] U.S. Cl. ................. 156/630; 156/628; 156/633; 156/651; 156/657; 156/662
[58] Field of Search ............ 156/628, 630, 633, 647, 156/651, 657, 659.1, 662; 29/621.1

[56] References Cited

U.S. PATENT DOCUMENTS

| | | | |
|---|---|---|---|
| 4,236,137 | 11/1980 | Kurtz et al. | 338/4 |
| 4,744,863 | 5/1988 | Guckel et al. | 156/653 |
| 4,784,721 | 11/1988 | Holmen et al. | 156/647 |
| 4,808,549 | 2/1989 | Mikkor et al. | 156/647 X |
| 4,853,669 | 8/1989 | Guckel et al. | 338/4 |
| 5,142,781 | 9/1992 | Mettner et al. | 29/890.124 |

FOREIGN PATENT DOCUMENTS 4018275 12/1990 Fed. Rep. of Germany.
WO91/03074 3/1991 World Int. Prop. O..

OTHER PUBLICATIONS

*VLSI Technology*, edited by S. M. Sze (McGraw-Hill, 1983, pp. 466–467).
*Halbleiter Elektronik* (Semiconductor Electronics), edited by D. Widmann et al. (Springer, 1988, vol. 19, pp. 67–73).
M. Shimbo et al./Toshiba, "A Newly Developed Silicon-to-Silicon Direct Adhesion Method," Journal of Electrochem. Soc. Extended Abstracts, vol. 86-1, Abstract No. 232, p. 337 (1986).
Theresa Lober & Roger Howe, "Surface Micro-Machining Processes For Electrostatic Microactuator Fabrication," IEEE publication THO215-4/83/0000-0059, I.E.E.E., N.Y. 1988.

*Primary Examiner*—William A. Powell
*Attorney, Agent, or Firm*—Frishauf, Holtz, Goodman & Woodward

[57] ABSTRACT

A process for producing micro-mechanical structures for sensors or actuators is proposed. Here, local oxidations are placed into the surfaces of at least two wafers with the aid of masking technology, so that level wafer surfaces are generated. The at least two wafers are subsequently connected with each other in such a way that the local oxidations of the at least two wafers are in direct contact. The actual sensor structure, which might possibly be mechanically deformable, is exposed by dissolving the local oxidations out.

12 Claims, 3 Drawing Sheets

PROCESS FOR PRODUCING MICRO-MECHANICAL STRUCTURES

FIELD OF THE INVENTION

The invention relates to a process for producing micro-mechanical structures for sensors or actuators in semiconductor wafers.

BACKGROUND

Various processes are already known for producing mechanical structures in semiconductor wafers. A differentiation between bulk processes and surface processes is made in this case. A bulk process is described in the German patent disclosure DE-OS 40 00 496, and corresponding WO 91/03074, published 7 Mar. 1991, for example, where recesses are etched into the surfaces of a semiconductor body with the aid of photographic masking technology, and paddles are exposed by undercutting ridges and etching the back. In the bulk process, the largest portion of a wafer is removed by an isotropic etching process in order to obtain the desired mechanical structure. This has the disadvantage that after etching the wafer has structures which are sensitive to breaking and must be treated accordingly. Furthermore, process-related inner stresses in the structures can lead to mechanical deformations which make further processing much more difficult.

A surface treatment process is described in "Surface Micromachining Process for Electrostatic Microactuator Fabrication" by Theresa A. Lober and Roger T. Howe, IEEE 1988, in which structured auxiliary layers are applied to the surface of a silicon wafer and form pedestal-like protrusions on the surface. Polysilicon is deposited on top of these pedestal-like protrusions, so that the polysilicon layer is partially in direct connection with the surface of the silicon wafer. By subsequent removal of the auxiliary layer, overhanging polysilicon cantilevers are created on the surface of the silicon wafer. With this process, the actually mechanically stressed structures cannot be made of mono-crystalline silicon, which has disadvantageous effects on the expected long-term stability.

A process is also known from the Journal of Electrochemical Society, Extended Abstracts, Vol. 86-1, Masaru Shimbo, Kazuyoshi Furukawa, Kyoshi Funkunda, "A Newly Developed Silicon to Silicon Direct Adhesion Method", by means of which silicon wafers can be bonded to each other without requiring an intermediate layer for this.

THE INVENTION

The process in accordance with the invention has the advantage that the micro-mechanical structures are protected against mechanical stress during the entire manufacturing process, because they are located in the interior of a silicon sandwich structure and are filled up with silicon oxide. This renders the total structure very stable and therefore also easy to process. Here it is also advantageous that possible stresses do not result in an undesirable deformation of the structure during processing, because mechanical deformability is achieved only at the very end, after removal of the oxide. It is of particular advantage that it is possible to produce the structures of mono-crystalline silicon, because of which an increased long-term stability, in comparison to polysilicon structures, can be expected.

Thus, complicated structures with, for example, asymmetrical depth values can be simply realized by producing local oxidations. In this connection, it is also advantageous that the local oxidations can be placed into the wafer from the front as well as the back of the wafer. A further advantage of the process is that silicon wafers can be simply connected with each other by silicon fusion bonding. The thickness of the total structure can be reduced in a particularly advantageous manner by the use of wafers having a doping junction, since the doping junction can be used as an etch stop. For exposing the structure, it is particularly advantageous to etch an opening which leads to the enclosed oxide into one of the wafers. It is then possible to dissolve it out in a particularly advantageous way with hydrofluoric acid (HF).

A particular advantage of the process in accordance with the invention lies in that the entire processing of the sensor or actuator, as well as possibly even the IC production, can be performed after the mechanical structure has been defined by the local oxidations, but before the structure has been exposed by dissolving out the oxide and in this way has achieved its mechanical deformability.

BRIEF DESCRIPTION OF THE DRAWINGS

An exemplary embodiment of the invention is illustrated in the drawings and will be explained in detail in the following description.

The wafers which are part of the assembly of the sensor structure are shown in FIGS. 1a to j in various stages of processing.

DETAILED DESCRIPTION OF THE INVENTION

Figure 1A:
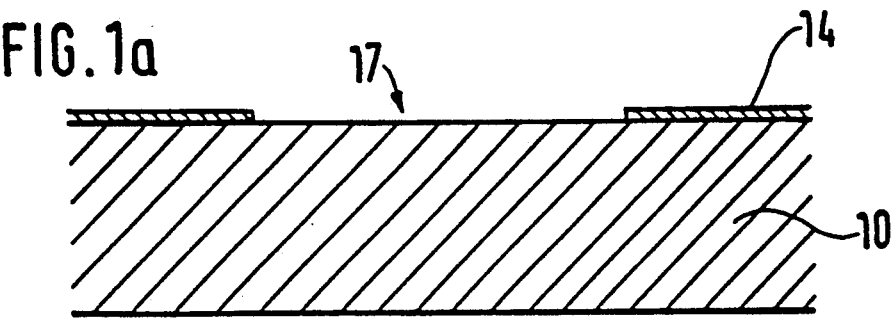

In accordance with the invention, at least two silicon wafers are combined in a sandwich structure in which the actual mechanical structure is located, but is filled up with silicon oxide. The at least two silicon wafers can have an arbitrary crystal orientation, can be undoped or provided with a doping concentration profile. In the process herein described, a structure is obtained having two silicon wafers with (100)-crystal orientation. The first wafer 10 has n-type doping; the second wafer 20 is a two-layered wafer consisting of a p-type substrate 21 and an n-type epitaxy layer 22 applied on top of it.

First, processing (LOCOS) of the individual wafers takes place, which can be carried out in parallel. For this, the surfaces 17, 27 of the single wafers 10, 20 are provided with a passivating layer 14, 24, preferably of $Si_3N_4$. By means of the structuring of the passivating layers 14, 24, it is determined at which positions on the wafer surfaces 17, 27 local oxidations are to be placed.

Figure 1B:
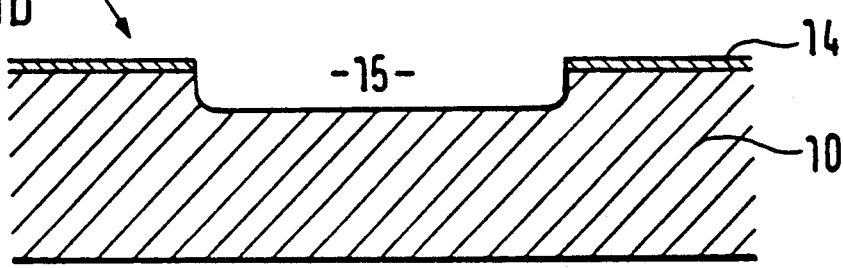

FIGS. 1a and d show the wafers 10 and 20 with structured passivation layers 14 and 24. Oxidations, which also penetrate into the wafers 10 and 20, are applied to the not masked areas of the surfaces 17 and 27 of the wafers 10 and 20. Cut-outs 15, 251, 252 in the surfaces 17 and 27 of the wafers 10 and 20 are generated by dissolving out these oxidations, as shown in FIGS. 1b and e. If necessary, these cut-outs 15, 251, 252 can be deepened by repeated oxidation and dissolving out of the oxide.

Subsequently, silicon oxide 13, 231, 232 is placed into the cut-outs 15, 251, 252, for example by a diffusion process, so that surfaces 17, 27 of the wafers 10, 20 which are as planar as possible are created.

Figure 1C:
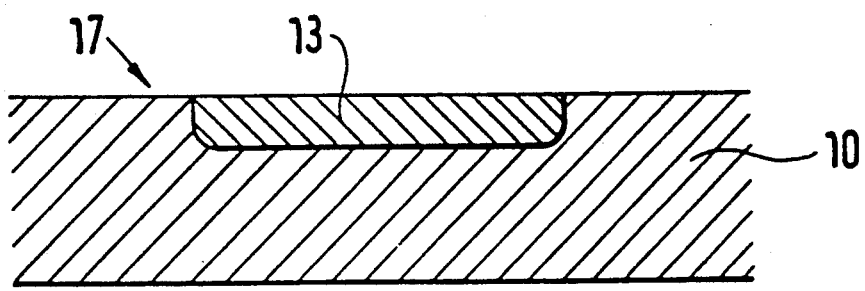
Figure 1D:
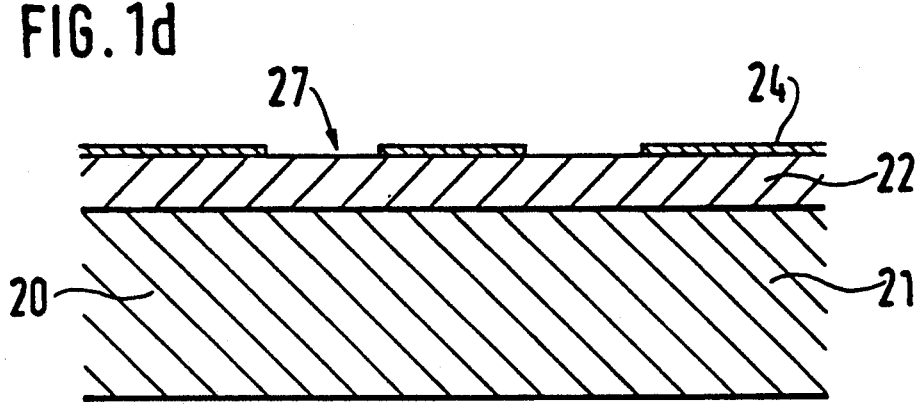
Figure 1E:
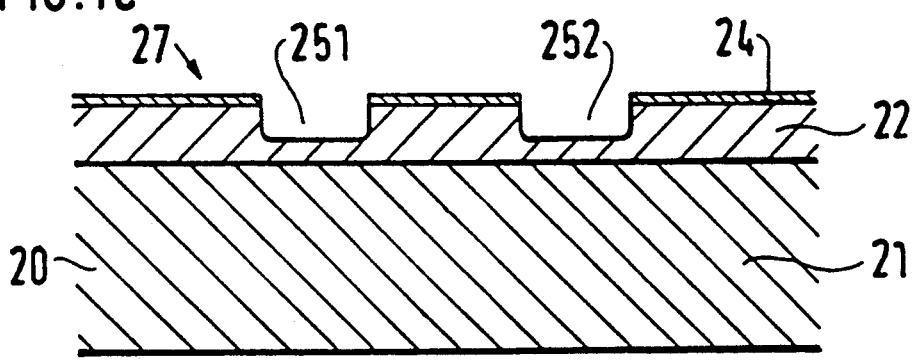
Figure 1F:
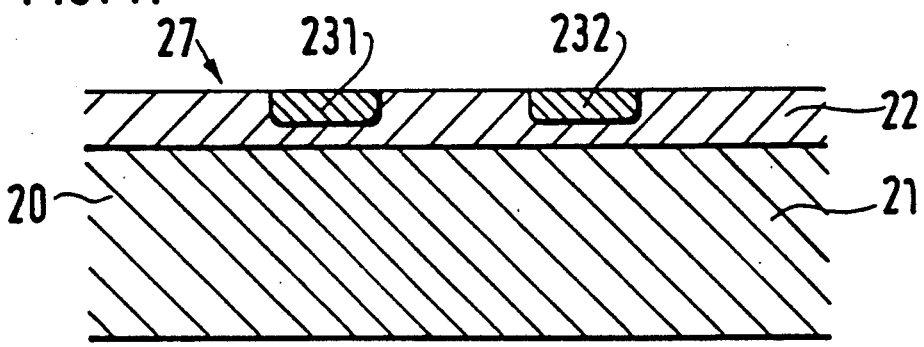

FIGS. 1c and f show the wafers 10 and 20 after placing the silicon oxide 13, 231, 232 in the cut-outs 15, 251, 252 and after removal of the passivating layers 14, 24. The two wafers 10 and 20 are bonded against each other in a subsequent process step in such a way, that the epitaxy layer 22 of the wafer 20 rests against the n-doped wafer 10. It is furthermore necessary to adjust the position of the local oxidations 231 and 232 in the wafer 20 to the position of the local oxidation 13 in the wafer 10.

Figure 1G:
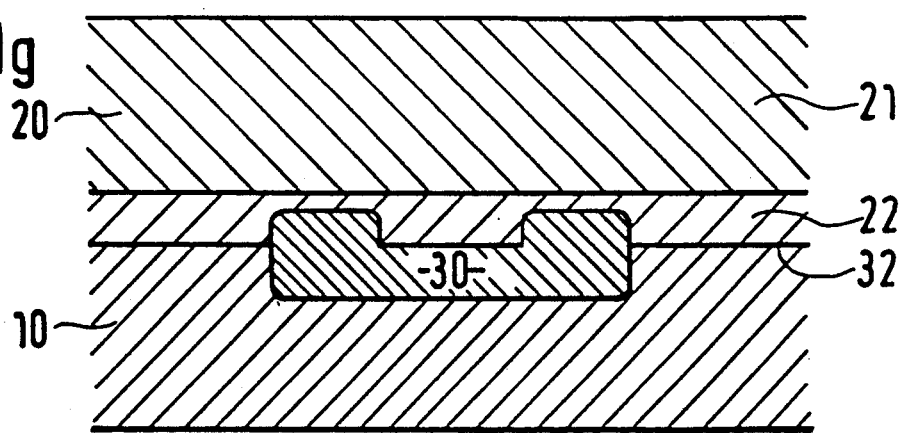
Figure 1H:
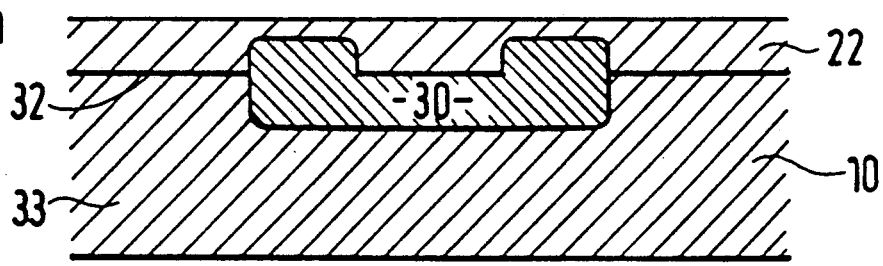

FIG. 1g illustrates a sandwich structure, in which the silicon oxide structure 30 created from the local oxidations 13, 231 and 232 is enclosed. The particular position of the doping layers can be used for reducing the thickness of the sandwich structure. Thus, the entire p-substrate 21 can be etched away in an electro-chemical etching step by using the pn-junction between the substrate 21 and the epitaxy layer 22 as an etch stop. An n-doped carrier 33 remains, in which the silicon oxide structure is enclosed, which is shown in FIG. 1h. The interface 32 between the original wafers 10 and 20 has no more importance after silicon fusion bonding.

Figure 1I:
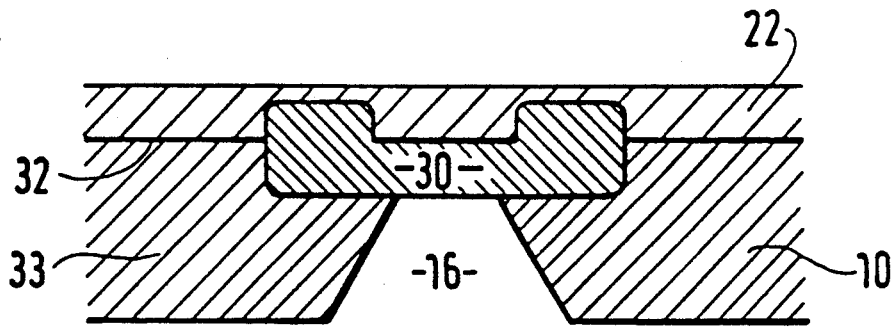

The entire processing of the sensor or actuator, as well as possibly an IC production, can be performed after this process step. An access to the enclosed silicon oxide 30 in the form of an opening 16 by means of electro-chemical etching is provided only when these steps have been finished. This is shown in FIG. 1i.

Figure 1J:
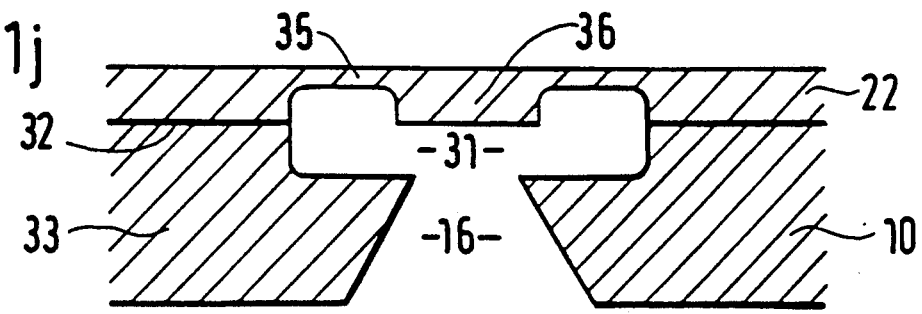

A suitable solution, such as hydrofluoric acid (HF), for example, can attack the silicon oxide of the structure 30 through the opening 16 and dissolve it out. By means of this, a hollow chamber 31 is created in place of the silicon oxide structure 30, because of which the actual sensor structure, shown in FIG. 1j, is exposed. This is a diaphragm with a seismic mass 36, which can be used in a pressure sensor, for example.

I claim:

1. A method of making micro-mechanical structures from a first (10) and a second (20) semiconductor wafer, comprising the steps of
    applying, to portions of a major surface of said first wafer, a passivating layer (14), leaving other portions of said surface exposed;
    causing local oxidation of said exposed other portions, thereby producing at least one recess or cut-out (15) in said major surface (17) of said first wafer (10);
    removing said passivating layer (14);
    filling said recess or cut-out with a semiconductor oxide (13), thereby forming a flat surface;
    bonding said flat surface (17) of said first wafer (10) to a major surface (27) of said second wafer (20), thereby forming a sandwich structure enclosing said semiconductor oxide (13, 30);
    forming an opening (16) extending from an outer surface of said sandwich structure to a surface of said semiconductor oxide; and
    applying an etching solution, through said opening (16), until said semiconductor oxide is dissolved away, thereby defining a chamber (31) within said sandwich structure.

2. The method in accordance with claim 1, characterized in that local oxidations are placed in both main surfaces of the first wafer (10).

3. The method in accordance with claim 1, characterized in that the first and second wafers (10, 20) are connected with each other by silicon fusion bonding.

4. The method in accordance with claim 1, further comprising the step of reducing thickness of the wafers (10, 20) connected with each other.

5. The method in accordance with claim 1, characterized in that the first and second wafers (10, 20) are so doped, that no doping junction appears at the interface (32) generated when the wafers (10, 20) are bonded, and that at least one of the wafers (10, 20) has a lower layer (21) and an upper layer (22), between which there is a doping junction.

6. The method in accordance with claim 5, characterized in that
    the doping junction, between the lower layer (21) and the upper layer (22), is used as an etch stop for reducing the thickness of the wafers (10, 20) connected with each other.

7. The method in accordance with claim 1, characterized in that the local oxidation (13, 231, 232) is dissolved out by means of hydrofluoric acid (HF).

8. The method of claim 1, further comprising,
    prior to bonding said first wafer to said second wafer,
    applying, to portions of a major surface of said second wafer, a passivating layer (24), leaving other portions of said surface (27) exposed;
    causing local oxidation of said exposed other portions, thereby producing at least one recess or cut-out (251, 252) in said major surface (27) of said second wafer (20);
    removing said passivating layer (24); and
    filling said recess or cut-out with a semiconductor oxide (231, 232), thereby forming a flat surface.

9. The method of claim 8, further comprising
    prior to bonding said first wafer to said second wafer,
    the step of aligning respective oxide-filled recesses of said first wafer and of said second wafer with each other.

10. The method of claim 1, wherein said wafers are of monocrystalline silicon.

11. The method of claim 10, wherein said step of filling comprises filling with an oxide of silicon.

12. The method of claim 1, further comprising, prior to said step of causing local oxidation, forming cut-outs in said major surface.

* * * * *